United States Patent
Levene et al.

(10) Patent No.: US 7,573,035 B2
(45) Date of Patent: Aug. 11, 2009

(54) GOS CERAMIC SCINTILLATING FIBER OPTICS X-RAY IMAGING PLATE FOR USE IN MEDICAL DF AND RF IMAGING AND IN CT

(75) Inventors: Simha Levene, D. N. Hanegev (IL); Rodney A. Mattson, Mentor, OH (US); Ami Altman, Haifa (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 165 days.

(21) Appl. No.: 11/577,604

(22) PCT Filed: Oct. 12, 2005

(86) PCT No.: PCT/IB2005/053359

§ 371 (c)(1), (2), (4) Date: Apr. 20, 2007

(87) PCT Pub. No.: WO2006/046163

PCT Pub. Date: May 4, 2006

(65) Prior Publication Data

US 2008/0063138 A1  Mar. 13, 2008

Related U.S. Application Data (60) Provisional application No. 60/623,748, filed on Oct. 29, 2004.

(51) Int. Cl.
*G01T 1/20* (2006.01)

(52) U.S. Cl. .................................. 250/361 R

(58) Field of Classification Search ............. 250/361 R, 250/363.01, 363.02, 363.1, 367, 368, 483.1, 250/484.4, 487.1, 488.1; 252/301
See application file for complete search history.

(56) References Cited

U.S. PATENT DOCUMENTS

| 4,234,792 A | 11/1980 | DeCou et al. |
| 4,734,588 A | 3/1988 | Akai |
| 4,799,094 A | 1/1989 | Rougeot |

(Continued)

FOREIGN PATENT DOCUMENTS

EP  1132754 A2  9/2001

*Primary Examiner*—David P Porta
*Assistant Examiner*—David S Baker (57) ABSTRACT

A radiation detector (24) for an imaging system includes a two-dimensional array (50) of nondeliquescent ceramic scintillating fibers or sheets (52). The scintillating fibers (52) are manufactured from a GOS ceramic material. Each scintillating fiber (52) has a width (d2) between 0.1 mm and 1 mm, a length (h2) between 0.1 mm and 2 mm and a height (h8) between 1 mm and 2 mm. Such scintillating fiber (52) has a height (h8) to cross-sectional dimension (d2, h2) ratio of approximately 10 to 1. The scintillating fibers (52) are held together by layers (86, 96) of a low index coating material. A two-dimensional array (32) of photodiodes (34) is positioned adjacent and in optical communication with the scintillating fibers (52) to convert the visible light into electrical signals. A grid (28) is disposed by the scintillating array (50). The grid (28) has the apertures (30) which correspond to a cross-section of the photodiodes (34) and determine a spatial resolution of the imaging system.

24 Claims, 9 Drawing Sheets

U.S. PATENT DOCUMENTS

| | | |
|---|---|---|
| 4,948,978 A | 8/1990 | Guyot |
| 4,980,553 A | 12/1990 | Henry |
| 4,985,633 A | 1/1991 | Vieux et al. |
| 5,150,394 A | 9/1992 | Karellas |
| 5,198,673 A | 3/1993 | Rougeot et al. |
| 5,262,649 A | 11/1993 | Antonuk et al. |
| 5,449,449 A | 9/1995 | Vieux et al. |
| 6,426,991 B1 | 7/2002 | Mattson et al. |
| 6,448,566 B1 * | 9/2002 | Riedner et al. ............ 250/483.1 |
| 6,453,899 B1 * | 9/2002 | Tselesin ...................... 125/15 |
| 6,510,195 B1 | 1/2003 | Chappo et al. |
| 6,553,092 B1 * | 4/2003 | Mattson et al. ................ 378/19 |
| 6,778,637 B2 | 8/2004 | Luhta et al. |
| 7,091,490 B2 * | 8/2006 | Sumiya et al. ............... 250/367 |
| 7,132,664 B1 * | 11/2006 | Crosetto ..................... 250/367 |
| 2003/0236388 A1 * | 12/2003 | Armstrong et al. ........... 528/408 |
| 2007/0096031 A1 * | 5/2007 | Meier et al. ............ 250/370.11 |
| 2007/0263764 A1 * | 11/2007 | Mccallum et al. ............. 378/19 |
| 2008/0210877 A1 * | 9/2008 | Altman et al. ............... 250/366 |
| 2009/0008562 A1 * | 1/2009 | Grazioso et al. ....... 250/363.04 |

\* cited by examiner

GOS CERAMIC SCINTILLATING FIBER OPTICS X-RAY IMAGING PLATE FOR USE IN MEDICAL DF AND RF IMAGING AND IN CT

CROSS REFERENCE TO RELATED APPLICATIONS

This application claims the benefit of U.S. provisional application Ser. No. 60/623,748 filed Oct. 29, 2004, which is incorporated herein by reference.

The present application relates to the use of the large imaging plates. The application subject matter finds particular use in computed tomography (CT) scanners and will be described with particular reference thereto. However, the invention finds use in connection with DF and RF imaging, x-ray fluoroscopy, radiography, and other examination systems for medical and non-medical examinations.

Computed tomography (CT) imaging typically employs an x-ray source that generates a fan-beam, wedge-beam, or cone-beam of x-rays that traverse an examination region. A subject arranged in the examination region interacts with and absorbs a portion of the traversing x-rays. A two-dimensional radiation detector including an array of detector elements is arranged opposite the x-ray source to detect and measure intensities of the transmitted x-rays.

Typically, the x-ray source and the radiation detector are mounted at opposite sides of a rotating gantry such that the gantry is rotated to obtain an angular range of projection views of the subject. In some configurations the x-ray source is mounted on the rotating gantry while the radiation detector is mounted on a stationary gantry. In either configuration, the projection views are reconstructed using filtered backprojection or another reconstruction method to produce a three-dimensional image representation of the subject or of a selected portion thereof.

The radiation detector typically includes an imaging plate consisting of an array of scintillation crystals which produce bursts of light, called scintillation events, in response to x-rays. An array of photodetectors such as a photodiode array is arranged to view the scintillation crystals and produce analog electrical signals indicative of the spatial location and intensity of the scintillation event. Large imaging plates, for the use in the CT scanners and general medical examinations, include an assembly of pixels independently responsive to the incident x-rays and generating electrical signals, which are used to generate a digital image. In some detectors the scintillator assembly includes an array of individual crystals which are assembled together or cut from a common scintillator plate, e.g., by photoetching or other semiconductor manufacturing techniques. To improve resolution in some large area imaging plates, the scintillation crystals are alkali halide needle crystals of a very small diameter. The needle crystals are grown to an appropriate length to ensure an adequate absorption of the x-rays to deliver a good optical image to the underlying photodiode array. The bundle of such grown needle crystals traps the x-rays and delivers an optical image of higher resolution to the underlying photodiode array.

The major disadvantage of the alkali needle crystals is the deliquescence. Such crystals must be protected from the ambient moisture by the hermetic sealing.

The present invention contemplates an improved method and apparatus which overcomes the above-referenced problems and others.

In accordance with one aspect of the present application, a radiation detector is disclosed. The radiation detector comprises a two-dimensional array of nondeliquescent ceramic scintillating fibers or sheets, which array views radiation events and converts the radiation events into visible light.

In accordance with another aspect of the present application, a method of manufacturing a radiation detector is disclosed. A two-dimensional scintillation array of nondeliquescent ceramic scintillating fibers or sheets is fabricated. The array converts received radiation events into visible light.

One advantage of the present application resides in the ability to shape and scale the detector array.

Another advantage resides in the absence of the deliquescence.

Yet another advantage resides in the radiation stability.

Numerous additional advantages and benefits will become apparent to those of ordinary skill in the art upon reading the following detailed description of the preferred embodiments.

The invention may take form in various components and arrangements of components, and in various process operations and arrangements of process operations. The drawings are only for the purpose of illustrating preferred embodiments and are not to be construed as limiting the invention.

Figure 1:
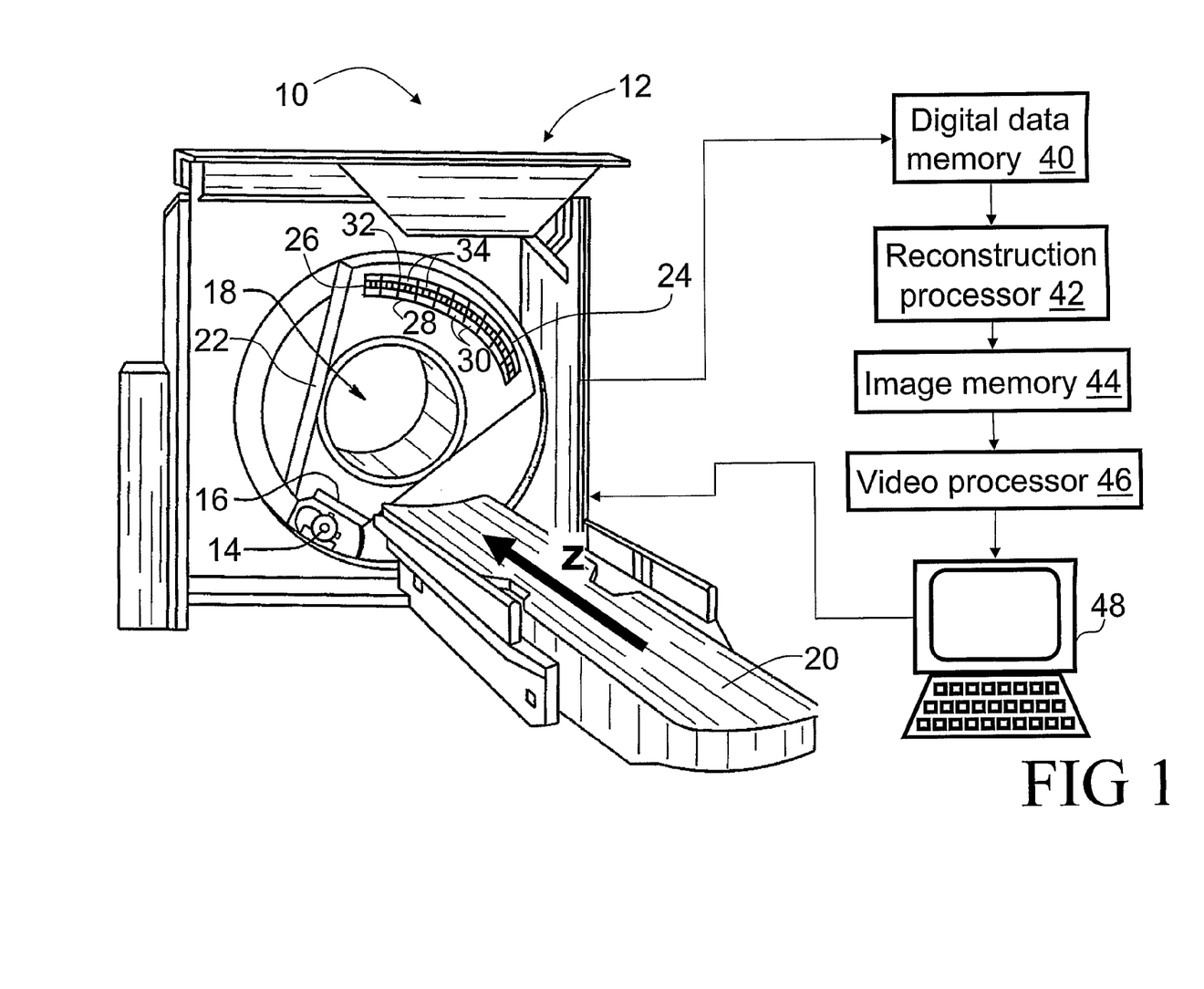
FIG. 1 is a diagrammatic illustration of an imaging system.

With reference to FIG. 1, a computed tomography (CT) imaging apparatus or CT scanner 10 includes a gantry 12. An x-ray source 14 and a source collimator 16 cooperate to produce a fan-shaped, cone-shaped, wedge-shaped, or otherwise-shaped x-ray beam directed into an examination region 18 which contains a subject (not shown) such as a patient arranged on a subject support 20. The subject support 20 is linearly movable in a Z-direction while the x-ray source 14 on a rotating gantry 22 rotates around the Z-axis.

Preferably, the rotating gantry 22 rotates simultaneously with linear advancement of the subject support 20 to produce a generally helical trajectory of the x-ray source 14 and collimator 16 about the examination region 18. However, other imaging modes can also be employed, such as a single- or multi-slice imaging mode in which the gantry 22 rotates as the subject support 20 remains stationary to produce a generally circular trajectory of the x-ray source 14 over which an axial image is acquired. After the axial image is acquired, the subject support optionally steps a pre-determined distance in the Z-direction and the axial image acquisition is repeated to acquire volumetric data in discrete steps along the Z-direction.

A radiation detector or detector array 24 is arranged on the gantry 22 across from the x-ray source 14. The radiation detector 24 includes a scintillation layer or array 26 of ceramic scintillating needles and spans a selected angular range that preferably comports with a fan angle of the x-ray beam. The radiation detector 24 also extends along the Z-direction. The detector 30 acquires a series of projection views as the gantry 22 rotates. It is also contemplated to arrange the radiation detector on a stationary portion of the gantry encircling the rotating gantry such that the x-rays continuously impinge upon a continuously shifting portion of the radiation detector during source rotation. Preferably, a spatial resolution of the scanner 10 is controlled by a grid 28, such as an anti-scatter grid, which is arranged on a radiation receiving face of the array 26 of scintillating needles. The grid 28 has apertures 30 which define the effective cross-section of each of the radiation rays that define the pixels of the views. An array 32 of photodiodes or other photodetectors 34 is provided on an opposite side of the scintillator needle array 26. The diodes 34 are sized and arranged to correspond to the apertures 30 in the grid 28. Alternatively, there may be no grid, in which case the spatial resolution is a function of the photodiode array.

With continuing reference to FIG. 1, the gantry 22 and the subject support 20 cooperate to obtain selected projection views of the subject along a helical trajectory or other trajectory of the x-ray source 14 relative to the subject. The path of the x-ray source 14 preferably provides substantial angular coverage for each voxel of the imaged region of interest to obviate image artifacts. Projection data collected by the radiation detector 24 are communicated to a digital data memory 40 for storage.

A reconstruction processor 42 reconstructs the acquired projection data, using filtered backprojection, an n-PI reconstruction method, or other reconstruction method, to generate a three-dimensional image representation of the subject or of a selected portion thereof which is stored in an image memory 44. The image representation is rendered or otherwise manipulated by a video processor 46 to produce a human-viewable image that is displayed on a user interface 48 or another display device, printing device, or the like for viewing by an operator.

Preferably, the user interface 48 is additionally programmed to interface a human operator with the CT scanner 12 to allow the operator to initialize, execute, and control CT imaging sessions. The user interface 48 is optionally interfaced with a communication network such as a hospital or clinic information network via which image reconstructions are transmitted to medical personnel, a patient information database is accessed, or the like.

Figure 2:
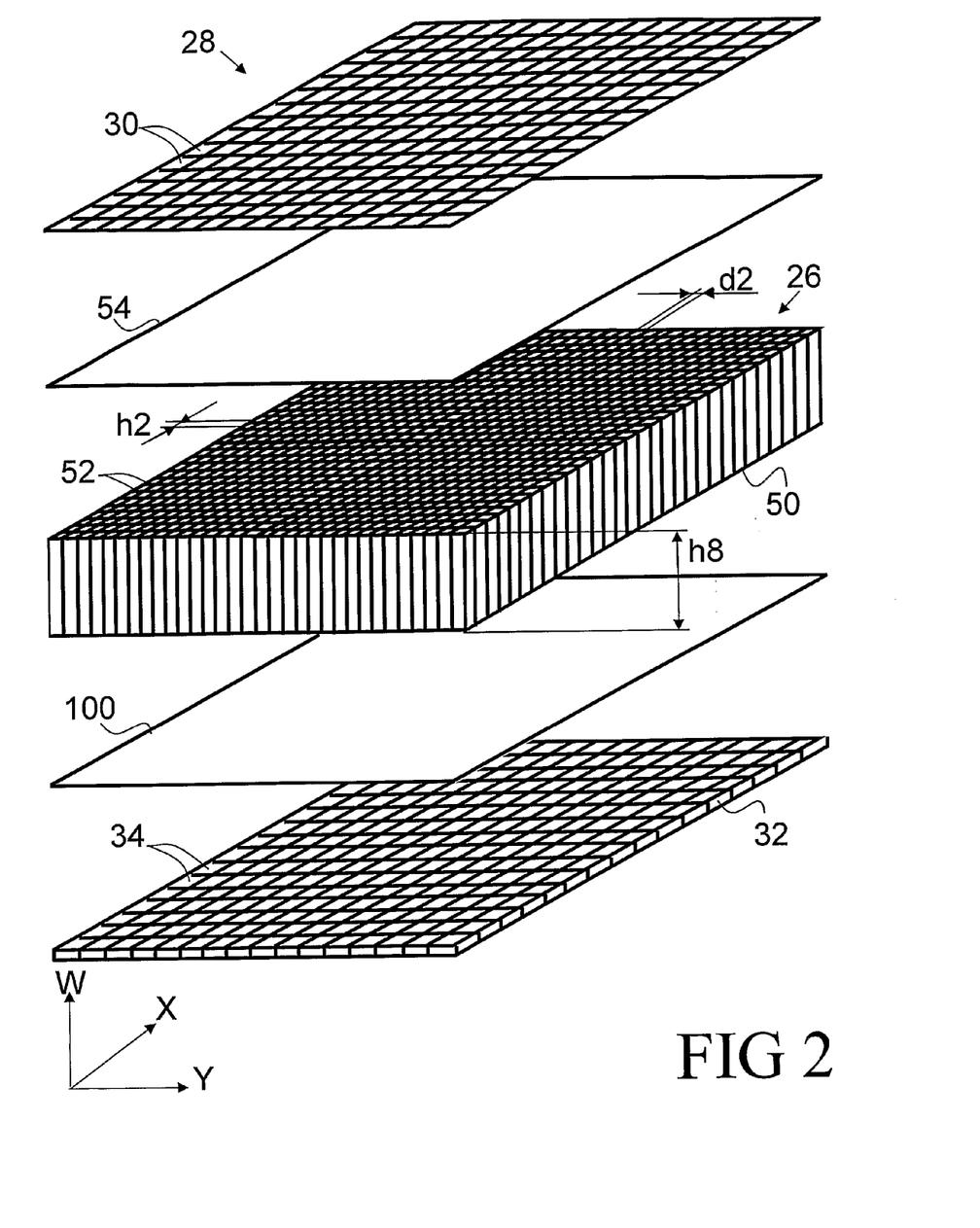
FIG. 2 diagrammatically illustrates a radiation detector.

With reference to FIG. 2, the photodetector array 32 of the photodiodes 34, such as silicon photodiodes, amorphous silicon, charge-coupled devices, CMOS, or other semiconductor photodetectors is in optical communication with the scintillation layer 26. The scintillation layer 26 includes a scintillation array 50 of individual scintillating strips, sheets, or fibers 52 which are formed from a material which emits visible light when x-ray radiation is incident upon the scintillation layer 26. The scintillation layer 26 is manufactured from a ceramic scintillator, preferably a gadolinium oxy sulfide (GOS) material. The fibers 52 of the scintillation array 50 preferably have a rectangular cross-section, although other close-packed geometries are also contemplated. The fibers are preferably under 0.2 mm thick, more preferably with cross-sectional dimensions of about 0.05 mm to about 1.0 mm×0.1 mm. Although one might call the embodiments in which the cross-section is significantly larger in one cross-sectional dimension than the other strips or sheets, "fiber" is used herein to refer to both strips with substantially equal cross-sectional dimensions and strips or sheets with significantly different cross-sectional dimensions. Spatial intensity patterns of light emitted from the scintillation fiber array 50 are proportional to spatial intensity patterns of the x-ray radiation having traversed the examination area 18. A top surface of the scintillation array 50 is painted or otherwise covered with a light reflective coating or layer 54. A bottom surface of the scintillation array 50 is left open to communicate light to the photodiode array 32.

Figure 3:
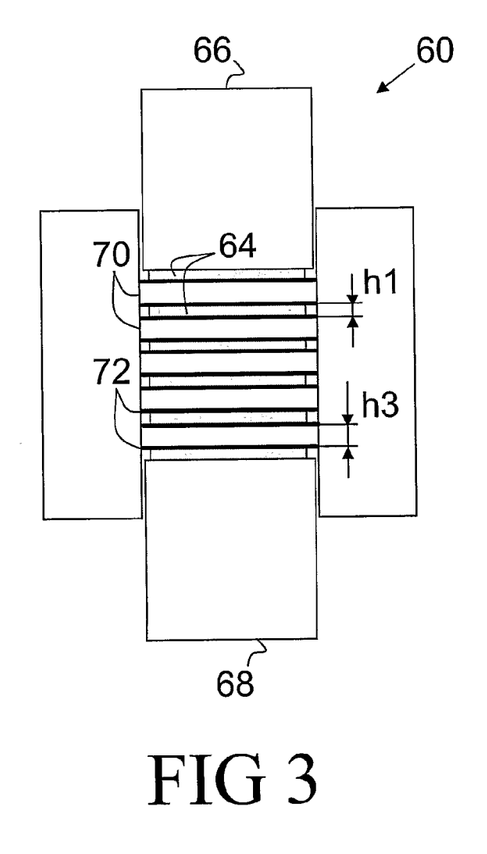
FIG. 3 diagrammatically illustrates a vertical press sintering GOS powder.
Figure 4A:
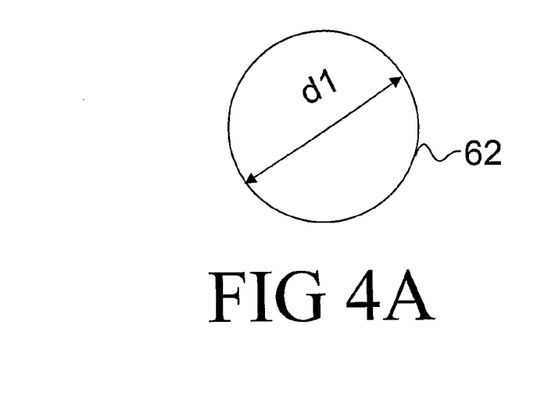
FIGS. 4A and 4B diagrammatically illustrate a GOS disc.
Figure 4B:
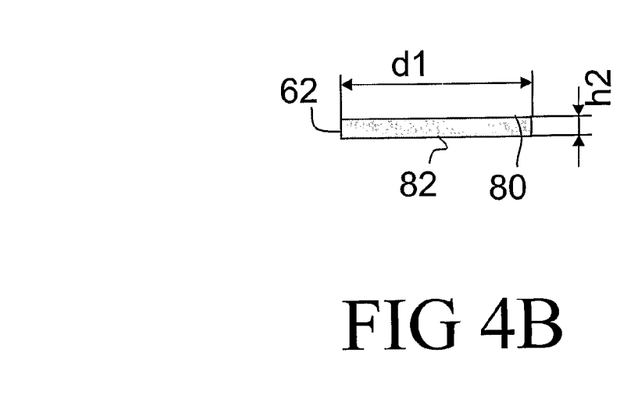

With reference to FIGS. 3 and 4A-B, a vertical sintering press 60 produces GOS disc(s) or wafer(s) 62 by sintering GOS powder layer or layers 64 appropriately at 1250° C. and 100-200 MPa of pressure. More specifically, the GOS powder layer 64 is pressed between an anvil 66 and a piston 68. The GOS powder layer 64 is preferably a finely divided layer with a starting thickness $h1$ of about 0.14 mm to make circular GOS discs 62 of a diameter $d1$ equal to 25-125 mm. Of course, it is also contemplated that the GOS discs 62 might be a square with each side $d1$ equal to 25-125 mm. A final thickness $h2$ of each disc 62 is preferably 0.1-0.3 mm. In one embodiment, the press 60 simultaneously produces the plurality of the GOS discs 62 by interlaying the GOS powder layers 64 with spacers 70. The materials used for the spacers 70 include, but are not limited to, molybdenum, molybdenum alloy, and other such refractory materials that are known for withstanding a high temperature. A thickness $h3$ of the spacers 70 is preferably equal to or exceeds 20 mm. In one embodiment, the spacers 70 are refractory-metal discs, preferably 30 μm thick. Such thin spacers allow a 30 cm high vertical sintering press 60, which is readily available in the industry, to manufacture over 1,000 GOS discs 0.1 mm thick each in a single cycle. Of course, it is also contemplated that the GOS discs 62 might be manufactured to have different thicknesses by appropriately adjusting the thickness $h1$ of the GOS powder layer 64.

Preferably, the spacers 70 are coated with a spacer coating layer 72 to ease a release of the GOS discs 62 after sintering. The materials, such as boron nitride and the like that are used for the spacer coating layer 72, produce a smooth glossy optical surface which results in elimination of further polishing. Preferably, upper and lower faces 80, 82 of each disc 62 are skimmed to remove any defective surfaces and polished.

Figure 5:
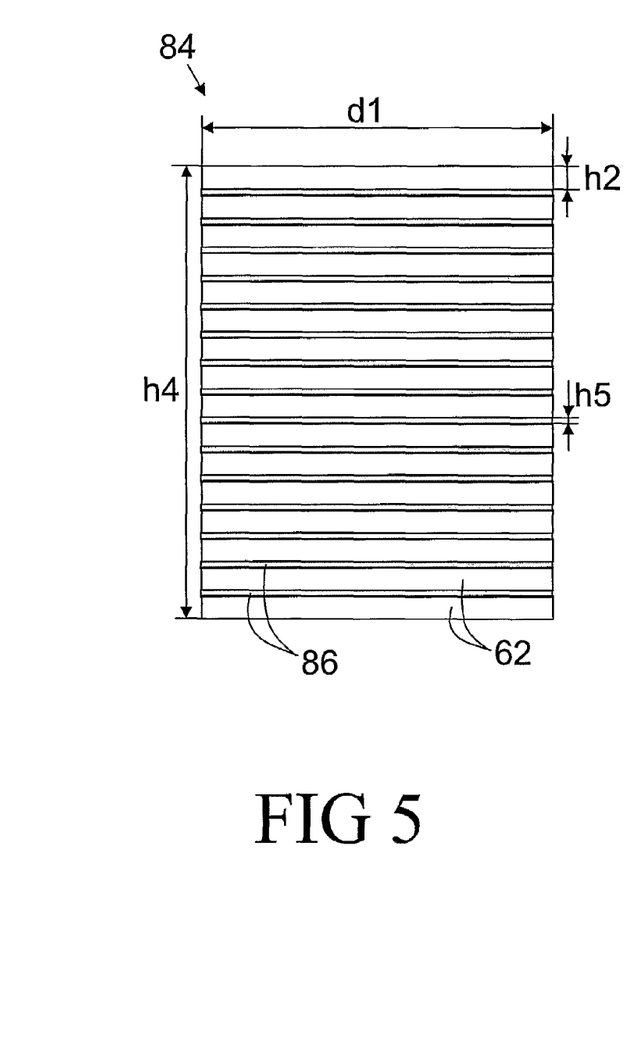
FIG. 5 diagrammatically illustrates GOS discs stacked together into a block.

With reference to FIG. 5, the smooth (polished) discs 62 are stacked into a first block 84 of a height $h4$ equal to about 25-50 mm. More specifically, the upper and lower faces 80, 82 of the discs 62 are coated with a first low index reflective layer 86 of a thickness $h5$ equal to about 0.005-0.01 mm. Preferably, the first layer 86 is formed of polyvinylidene fluoride (PVDF), which has a reflective index of about 1.31, as it is advantageous to use a coating material with a very low reflective index. However, other appropriate materials, including low index clear adhesive material, epoxy resin, and other low index reflective materials, are also contemplated to use as the coating layer 86.

Figure 6A:
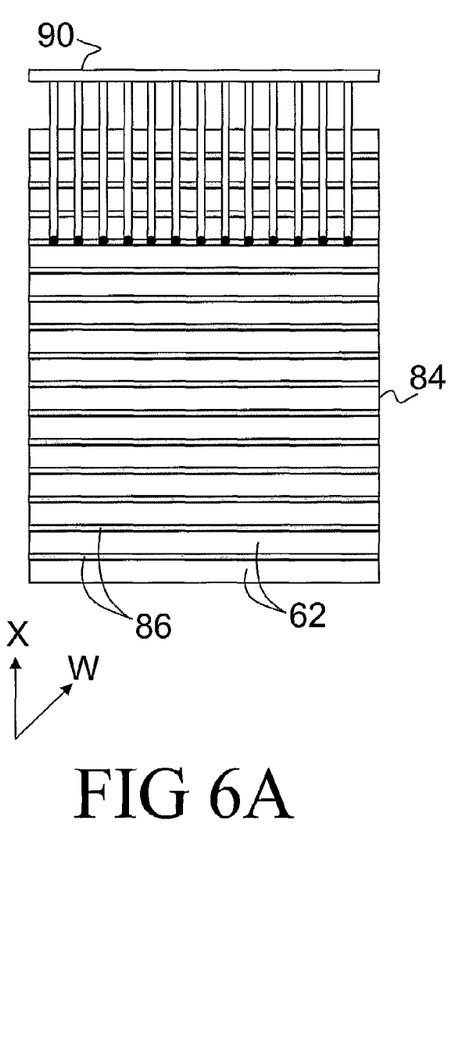
FIG. 6A diagrammatically illustrates the stacked GOS discs being diced by a saw in a first direction.
Figure 6B:
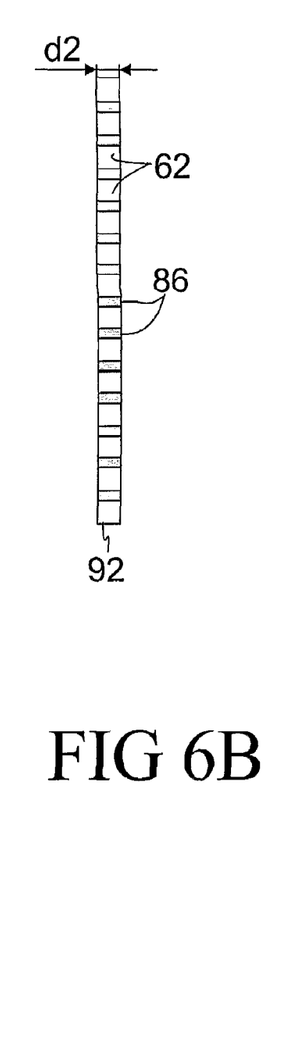
FIG. 6B diagrammatically illustrates one of the plates that was obtained by dicing a stacked block of the GOS discs.

With reference to FIGS. 6A-B, the first block 84 is diced with a multi-wire saw 90 in a first direction W into plates 92 each with a selected thickness $d2$, equal to about 0.1 mm, i.e., $h2$, in the presently illustrated embodiment. In the sheet embodiments, a $d2$ dimension of about 1 mm is preferred. Preferably, the plates 92 are polished to achieve a smooth optical surface.

Figure 7:
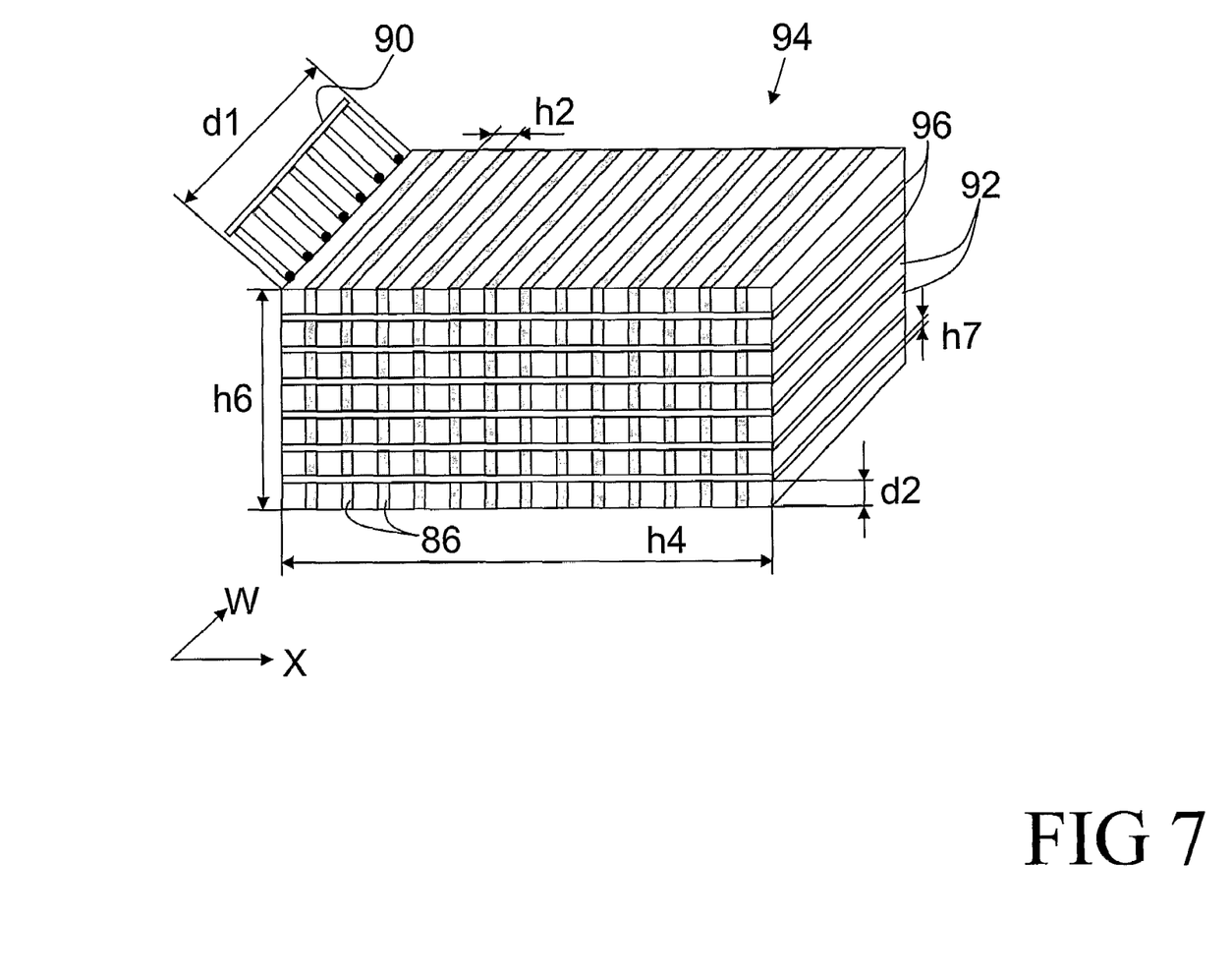
FIG. 7 diagrammatically illustrates diced plates being stacked together into a second block and being diced by a saw in the second direction.

With reference again to FIG. 2 and further reference to FIG. 7, the plates 92 are stacked or glued together into a second block 94 to a height $h6$ equal to about 25 mm. More specifically, the plates 92 are coated with a second layer or coating material 96 of a thickness h7 equal to about 0.005-0.01 mm. The second coating material 96 is preferably the same low index reflective material as is used for the first coating layer 86, such as polyvinylidene fluoride (PVDF), epoxy resin, clear adhesive material, or other low index reflective material. The second block 94 is sliced in a second direction X, orthogonal to the first direction W, with the multi-wire saw 90 to form the ceramic fiber optic scintillation sheets 50 with a thickness h8 equal to about 1.4-2 mm, the exact height selected in accordance with the energy of the radiation to be received. The scintillating fibers 52 of the ceramic fiber sheets 50 have a cross-section h2×d2 equal to preferably 0.1 mm×0.1 mm–1 mm and are held together by the first and second reflective coating layers 86, 96.

In one embodiment, the 100-200μ thick discs 62 are coated with the first layer 86 and stacked together into the first block 84. The first block 84 is diced with the multi-wire saw 90 in the first direction W into the plates 92 each with the thickness d2, equal to about 1-1.04 mm. The plates 92 are coated with the second layer 96 and stacked together into the second block 94. The second block 94 is sliced in the second direction X, orthogonal to the first direction W, with the multi-wire saw 90 to form the ceramic fiber optic scintillation strips 50 with the thickness h8 equal to about 1.4 mm.

Figure 8A:
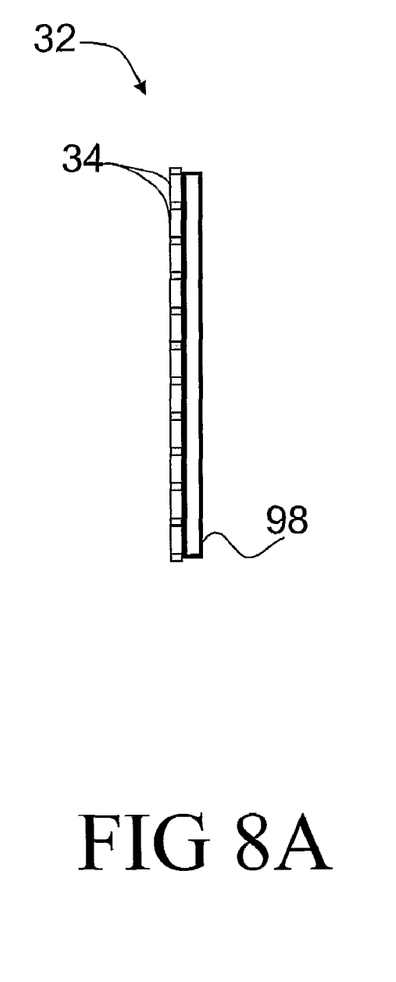
FIGS. 8A and 8B diagrammatically illustrate photodiodes positioned on substrate.
Figure 8B:
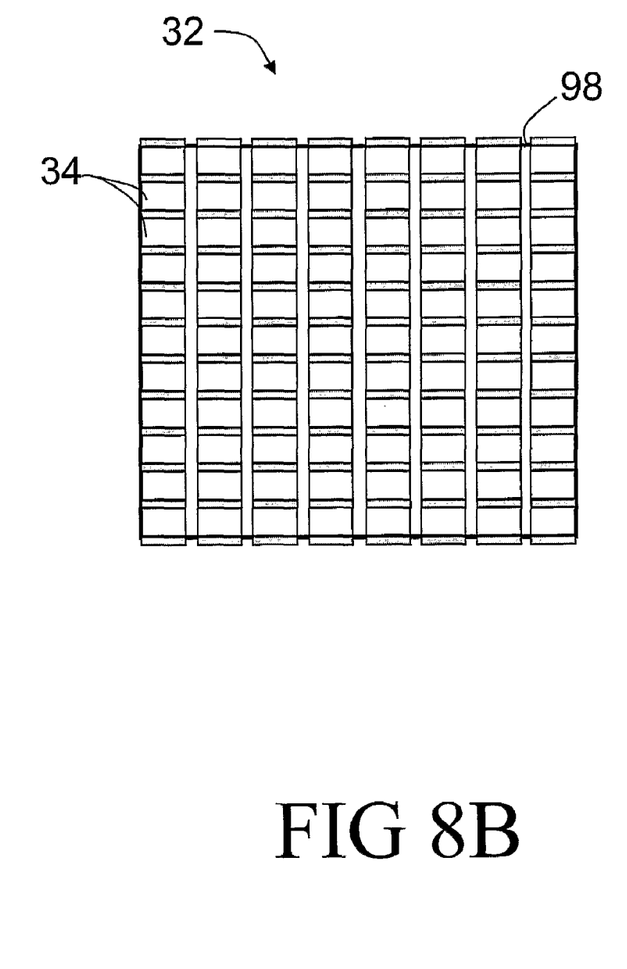

With continuing reference to FIG. 2 and further reference to FIGS. 8A-B, the photodetector array 32 is mounted on a substrate 98. The individual photodiodes 34 preferably correspond in size and position with the apertures 30 of the grid 28 if the grid is used. Each photodiode 34 has a cross-section which is the same as or larger than a cross-section of a corresponding crystal fiber 52 of the scintillation fiber layer 26 to form the detector array 24. Preferably, the photodiode array 32 and the scintillation layer 26 are held in place by an optically transmissive adhesive layer 100, e.g., optical coupling cement, or the like.

In one embodiment, the photodiode array 32 includes BIP or back-illuminated diodes 34 and is a single, monolithic, semiconductor substrate having functional integrated circuitry formed thereon. The functional integrated circuitry includes a matrix of photosensitive elements or "pixels," preferably photodiodes, formed on the light receiving side. The integrated circuitry of the array 32 is generally manufactured from silicon or other semiconductor wafers using established integrated circuit fabrication processes, such as masking, evaporation, etching, and diffusion processes, and so forth.

Figure 9:
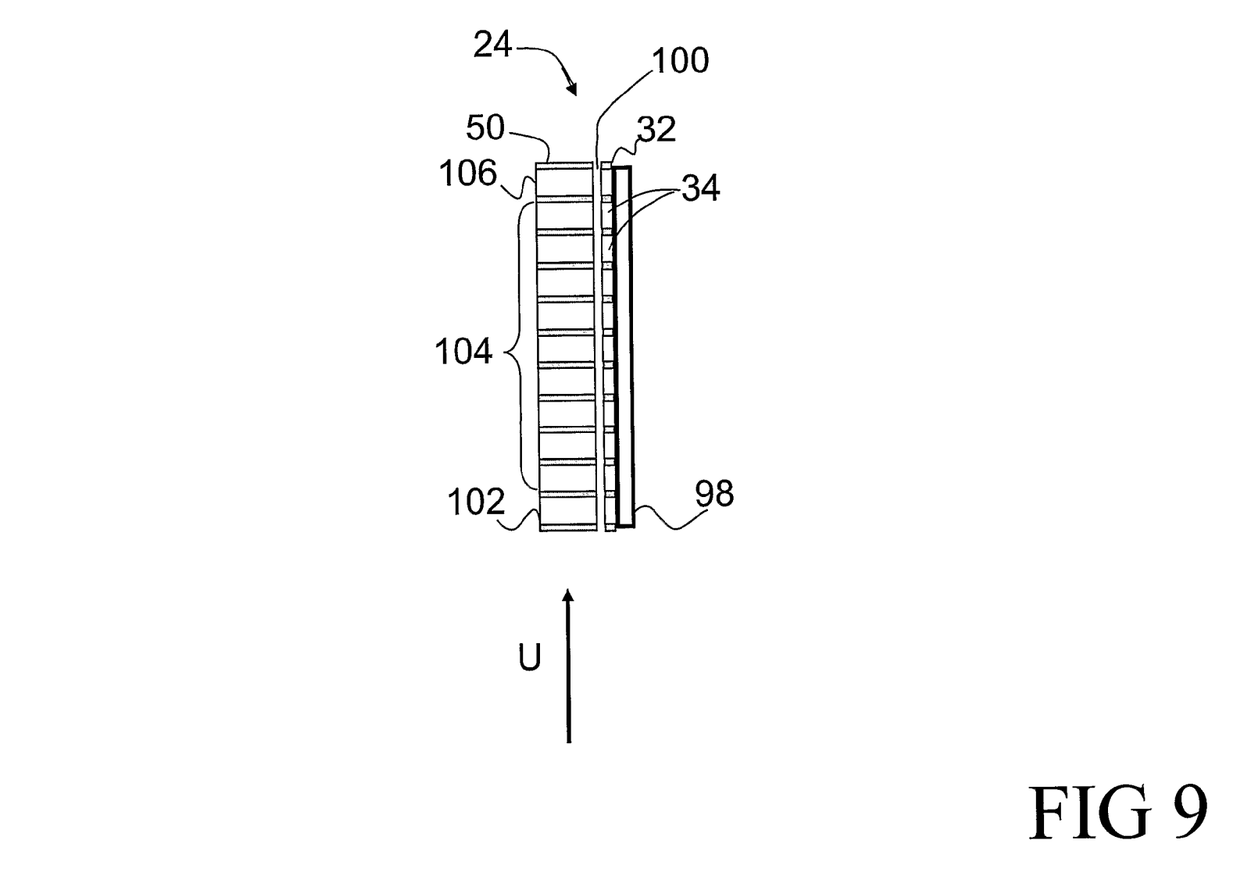
FIG. 9 diagrammatically illustrates a side view of a portion of a radiation detector.

With reference to FIG. 9, the scintillation array 50 and the photodetector array 32 of a spectral CT scanner are assembled into the detector array 24 for each CT slice. The detector array 24 includes a plurality of detector elements or dixels. X-rays, which have passed through the examination region 18, impinge on the detector array 24 along a direction U in this spectral embodiment. A lower layer 102 of the fibers 52 at the x-ray entrance side converts the softest or lowest energy x-rays in the beam which has passed through the examination region 18 into light. Progressively more energy is needed to reach each successive intermediate layer. Thus, each successive intermediate layer 104 converts progressively harder x-rays into light. A top or last layer 106 receives the hardest x-rays. Light signals from the dixels of each layer 102, 104, 106 are detected by the corresponding photodiodes 34 of the photodiode array 32. The signals from the dixels of each layer 102-106 are then weighted and combined to form spectrally weighted image data. The weighting may include zeroing one or more of the dixel layers. By selecting different relative weighting among the dixels, image data is generated which emphasizes and deemphasizes selected portions of the energy spectrum, i.e. selected x-ray energy absorption ranges.

By appropriately selecting the weighting, CT images are reconstructed of specific selected x-ray energy absorption ranges to emphasize tissues while other selected tissues are superseded or substantially erased in the reconstructed image. For example, calcium in mammary tissue, and iodine in a contrast medium can be emphasized by subtracting images weighted to emphasize either side of the respective absorption lines. The use of a ceramic scintillating array in this embodiment enables the user to select the combinations of energies producing the best diagnostic image by coupling the respective photodiodes in the appropriate manner.

Figure 10:
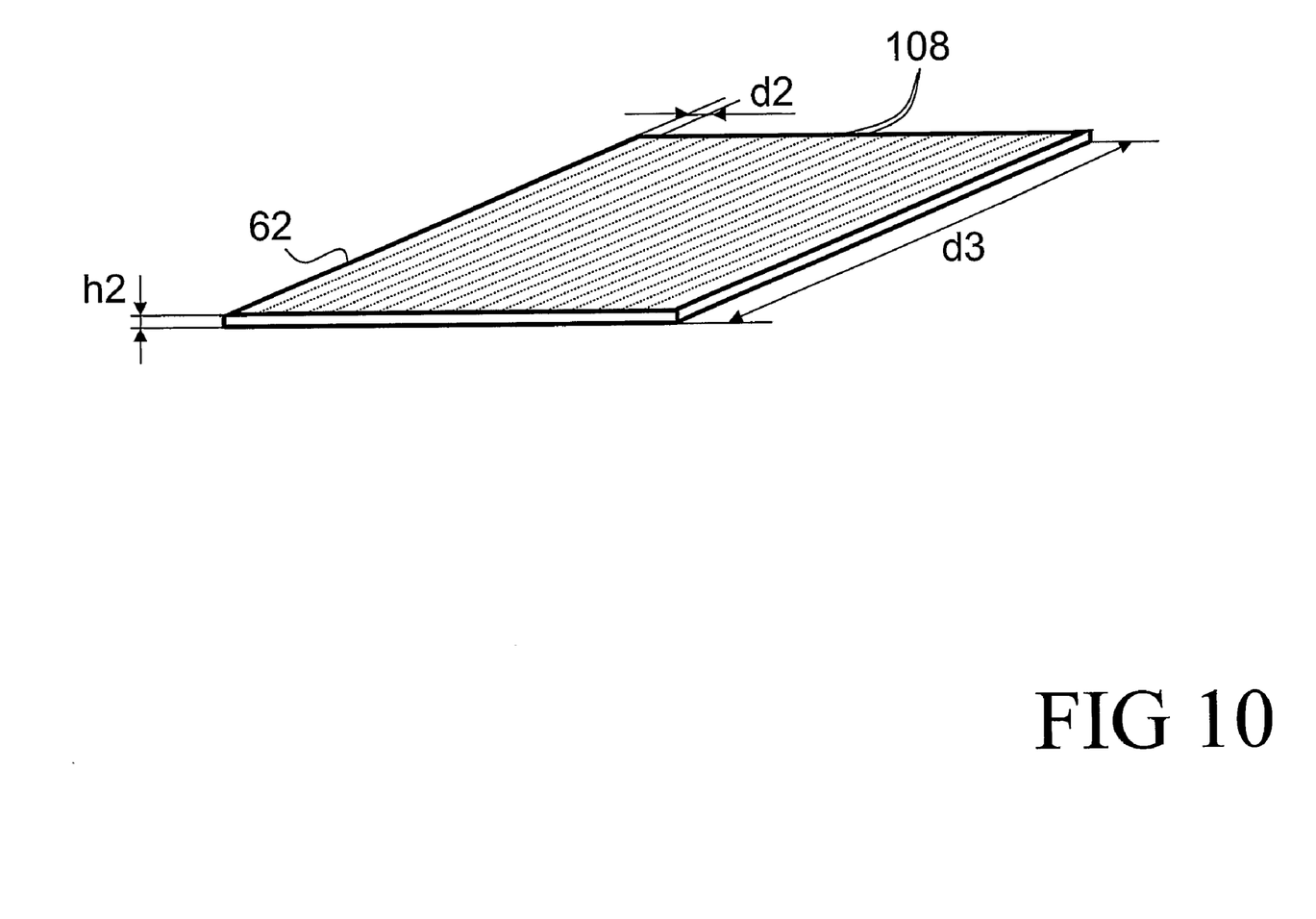
FIG. 10 diagrammatically illustrates a GOS disc being cut into light guides.

With reference to FIG. 10, in one embodiment, the discs 62 are divided individually into rectangular light guides 108. Each light guide 108 has a cross-section h2×d2 equal to preferably about 0.1 mm×0.1 mm–1 mm and a length d3 equal up to 100 mm. The discs 62 might be cut with scissors, a light precision guillotine, sheared, or the like. The light guides 108 of similar lengths are bundled together into bundles 2-100 mm thick and stuck together using one of the low index reflective materials such as PVDF, epoxy resin, clear adhesive, or the like. Preferably, the bundles are formed into the scintillation sheets 50 of 25 mm×25 mm and sliced to slabs 1 mm to 2 mm thick, depending on the x-ray absorption required. Such bundles can be used to manufacture x-ray imaging plates, large area CT scintillating arrays, and in the like imaging apparatuses.

Figure 11:
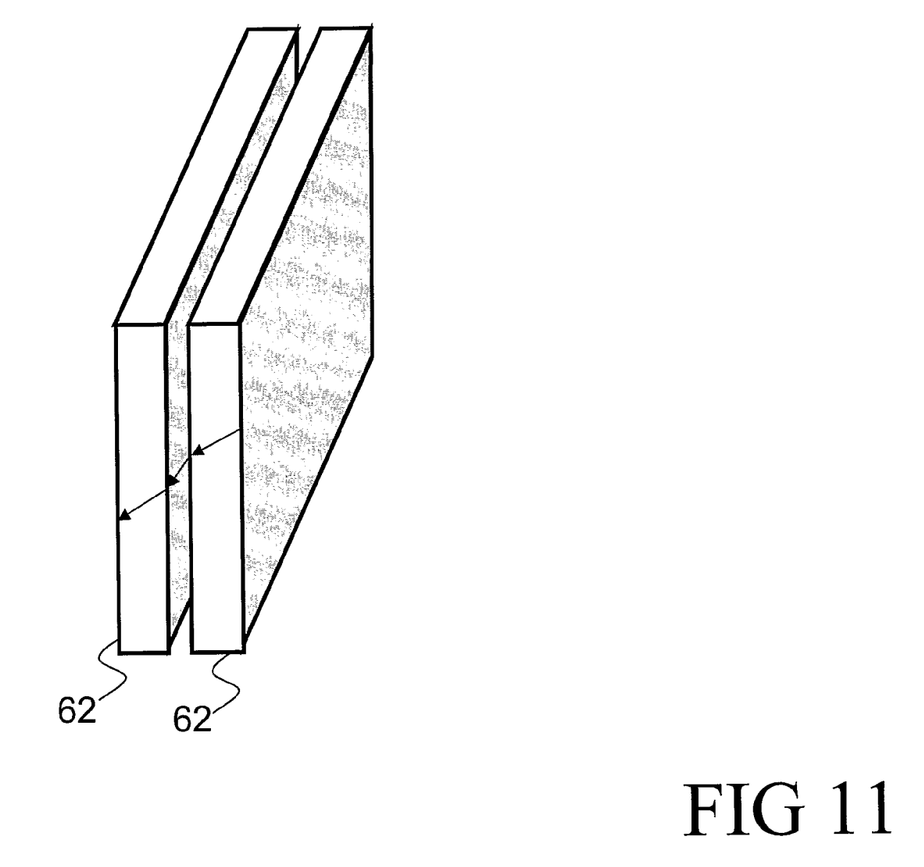
FIG. 11 diagrammatically illustrates light traveling inside the ceramic fiber walls.

With reference to FIG. 11, despite the low matrix refractive index, fluorescent light at higher angles penetrates the ceramic optic walls to generate veiling glare. The critical angles for a GOS rod in the coating layers 86, 96, if the coating layers are formed of the PVDF material, is about 59 degrees. In one embodiment, the coating layers 86, 96 are enriched with an absorbing material, such as carbon black, to prevent veiling glare. Such a blended coating material will absorb every color including the light necessary to produce a quality image. One must balance the use of the absorbing dye to block the veiling glare and the need for the visible light to pass through. Alternatively, instead of blending the dye into the coating material, an additional absorbent coating layer is put outside the layers 86, 96 to inhibit light from escaping from the reflective layer. Preferably, the absorbent coating layer comes into contact only with the low-index coating layers, but does not come into contact with the GOS ceramic optic to prevent substantial light absorption therein.

The application has been described with reference to the preferred embodiments. Obviously, modifications and alterations will occur to others upon reading and understanding the preceding detailed description. It is intended that the application be construed as including all such modifications and alterations insofar as they come within the scope of the appended claims or the equivalents thereof.

The invention claimed is:
1. A radiation detector including:
a two-dimensional sintered array of nondeliquescent gadolinium oxy sulfide (GOS) ceramic scintillating fibers oriented perpendicular to a direction of incident radiation to view radiation events and convert the radiation events into visible light, the scintillating fibers having a length to cross-sectional dimension ratio of at least 10 to 1;
a coating material which coats and holds the scintillating fibers together; and
a two-dimensional array of light sensitive elements which is adjacent and in optical communication with ends of the scintillating fibers to view the visible light and convert the visible light into electrical signals.

2. The detector as set forth in claim 1, wherein each scintillating fiber has a width between 0.1 mm and 0.2 mm, a length between 0.1 mm and 1 mm and a height between 1 mm and 2 mm.

3. The detector as set forth in claim 1, wherein the coating material forms a reflecting layer around each fiber to reflect light from each fiber back into the fiber and further including:
a light blocking material coating the reflecting layer to inhibit light from escaping from the light reflecting layer.

4. The detector as set forth in claim 1, wherein the coating material includes one of a polyvinylidene fluoride and epoxy resin.

5. The detector as set forth in claim 1, wherein a cross-section of each light sensitive element is greater than a cross-section of the scintillating fibers.

6. The detector as set forth in claim 1, further including:
a grid with apertures corresponding to the light sensitive elements.

7. A computed tomography scanner for a use with the radiation detector of claim 1.

8. A diagnostic imaging device including:
an x-ray source; and
the radiation detector of claim 1 mounted to receive radiation from the source.

9. The detector as set forth in claim 1, wherein the light sensitive elements lie in a plane parallel to the direction of incident radiation.

10. A method of manufacturing a radiation detector comprising:
sintering gadolinium oxy sulfide (GOS) powder layers to manufacture GOS discs;
coating at least a face of the GOS discs with an optically reflective material;
stacking the coated GOS discs;
fabricating the stack of coated GOS discs into a two-dimensional scintillation array of GOS fibers or sheets, which array converts received radiation events into visible light; and
optically coupling the two-dimensional scintillation array of GOS fibers or sheets to a photodetector array.

11. The method as set forth in claim 10, further including:
interlaying GOS powder layers with spacers in the vertical sintering press.

12. The method as set forth in claim 10, wherein each disc has a thickness between 0.1 mm and 1 mm.

13. The method as set forth in claim 10, wherein the reflective material is one of a polyvinylidene fluoride and epoxy resin.

14. The method as set forth in claim 10, wherein each scintillating fiber or sheet has a height to cross-sectional dimension ratio of at least 10 to 1.

15. A radiation detector manufactured by the method of claim 10.

16. A method of manufacturing a radiation detector comprising:
fabricating a two-dimensional scintillation array of non-deliquescent ceramic scintillating fibers or sheets, the scintillating fibers or sheets including a gadolinium oxy sulfide (GOS) material, which array converts received radiation events into visible light;
sintering powder layers of the GOS in a vertical sintering press to manufacture GOS discs;
coating upper and lower surfaces of each disc with a first reflective mMaterial, the step of coating including one of:
supplementing the reflective material with an absorbent material prior to the step of coating, and
covering the reflective material with an absorbent coating layer; and
stacking the discs together into a first block.

17. A radiation detector manufactured by the method of claim 16.

18. A method of manufacturing a radiation detector, comprising:
sintering powder layers of gadolinium oxy sulfide (GOS) into a plurality of GOS sheets which are 0.1 mm to 1 mm thick;
coating each GOS sheet with an optically reflective material;
stacking the coated GOS sheets to define a block;
slicing the block in a first direction to generate a plurality of plates each having a thickness between 0.1 mm and 1 mm, each plate having alternating layers of the GOS and the reflective material;
coating upper and lower surfaces of each plate with the reflective material;
stacking the reflective material coated plates together into a second block to define a plurality of parallel GOS fibers in the first direction in a matrix of the reflective material;
slicing the second block in a second direction orthogonal to the first direction to define a slab; and
optically coupling the GOS fibers of the slab with an array of photodetectors.

19. The method as set forth in claim 10, wherein the fabricating step includes:
slicing the stack of coated GOS discs in a first direction to form a plurality of plates;
coating at least a face of the plates with the optically reflective material;
stacking the coated plates;
slicing the stack of coated plates in a second direction, orthogonal to the first direction, to form the scintillation array of GOS fibers or sheets, each GOS fiber or sheet being coated with the optically reflective material.

20. The method as set forth in claim 19, further including:
coating the optically reflective material with a light transmission blocking material.

21. The method according to claim 19, wherein the reflective material includes one of polyvinylidine fluoride and epoxy.

22. The method as set forth in claim 19, wherein each scintillating fiber or sheet has a width between 0.1 mm and 1 mm, a length between 0.1 mm and 2 mm, and a length between 1 mm and 2 mm.

23. The method set forth in claim 18, further including:
applying a reflective coating to the ends of the GOS fibers opposite to the photodetectors.

24. A radiation detector manufactured by the method of claim 18.

* * * * *